United States Patent
Whitney et al.

(10) Patent No.: US 10,585,680 B2
(45) Date of Patent: Mar. 10, 2020

(54) DYNAMIC DASHBOARD WITH INTELLIGENT VISUALIZATION

(71) Applicant: Cisco Technology, Inc., San Jose, CA (US)

(72) Inventors: Jonathan N. S. Whitney, Belmont, CA (US); Tao Wang, Daly City, CA (US); Ryan O'Connell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 15/142,813

(22) Filed: Apr. 29, 2016

(65) Prior Publication Data

US 2017/0255476 A1    Sep. 7, 2017

Related U.S. Application Data

(60) Provisional application No. 62/302,631, filed on Mar. 2, 2016.

(51) Int. Cl.

| | |
|---|---|
| *G06F 3/048* | (2013.01) |
| *G06F 9/451* | (2018.01) |
| *H04L 29/08* | (2006.01) |
| *G06T 11/20* | (2006.01) |
| *G06Q 10/06* | (2012.01) |
| *G06F 11/34* | (2006.01) |
| *G06F 11/30* | (2006.01) |
| *G06F 11/07* | (2006.01) |
| *G06F 9/445* | (2018.01) |

(52) U.S. Cl.
CPC ............. *G06F 9/451* (2018.02); *G06F 3/048* (2013.01); *G06F 11/0766* (2013.01); *G06F 11/3006* (2013.01); *G06F 11/3438* (2013.01); *G06F 11/3452* (2013.01); *G06Q 10/0639* (2013.01); *G06T 11/206* (2013.01); *H04L 67/22* (2013.01); *G06F 9/4451* (2013.01); *G06T 2200/24* (2013.01)

(58) Field of Classification Search
CPC ........ G06F 3/0484; G06F 11/30; G06F 3/048; G06F 9/46; G06Q 10/06; G06N 5/00; H04L 67/22
See application file for complete search history.

(56) References Cited

U.S. PATENT DOCUMENTS

| | | | | |
|---|---|---|---|---|
| 7,133,805 B1* | 11/2006 | Dankenbring | ...... | G06F 11/3414 702/186 |
| 9,491,247 B2* | 11/2016 | Bansal | ..................... | H04L 67/22 |
| 2009/0172562 A1* | 7/2009 | Lai | ....................... | G06F 3/04817 715/745 |
| 2013/0205020 A1* | 8/2013 | Broda | ................. | G06F 11/3495 709/224 |
| 2015/0019991 A1* | 1/2015 | Kristj Nsson | ....... | H04L 41/0853 715/747 |
| 2015/0058092 A1* | 2/2015 | Rea | ..................... | G06Q 10/0639 705/7.38 |

* cited by examiner

*Primary Examiner* — Rashawn N Tillery
(74) *Attorney, Agent, or Firm* — Behmke Innovation Group LLC; James Behmke; Stephen D. LeBarron

(57) ABSTRACT

An interface for communicating the status of a distributed business transaction using widgets is provided. The widgets may be dynamically identified and automatically created such that they are useful and of interest to a user of the dashboard. The location of the widgets within the dashboard may be dynamically positioned such that the most important widgets are provided to preferred locations for particular user.

19 Claims, 7 Drawing Sheets

DYNAMIC DASHBOARD WITH INTELLIGENT VISUALIZATION

CLAIM OF PRIORITY

This patent document is a non-provisional of and claims the benefits and priorities to U.S. Provisional Patent Application No. 62/302,631 filed Mar. 2, 2016. Contents of the provisional application are incorporated by reference.

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. These typical reports provide static information that is not tailored to particular users. As a result, most typical reports are either not very helpful or must be analyzed by a user to determine useful information contained in the report.

SUMMARY

The present technology provides a dashboard for communicating the status of a distributed business transaction using widgets. The widgets may be dynamically identified and automatically rendered such that they are useful and of interest to a user of the dashboard. The location of the widgets within the dashboard may be dynamically positioned such that the most important widgets are provided to preferred locations for particular user.

Some implementations may include a method for reporting data within an interface. A request can be received for an interface by a server from a remote client device. A widget to be rendered in the interface can be automatically identified. The widget may be automatically identified based on an event detected in response to the request t. The interface with the identified widget can be provided to the remote client device by the server.

Some implementations may include another method for reporting data within an interface. An interface having two or more widgets can be provided by a server to a remote client device. User interaction with each of the two or more widgets within the interface can be monitored. The location of each of the two or more widgets can be automatically updated based on the user interaction with each widget.

In one aspect, a method for reporting performance data within an interface is disclosed. The method includes: receiving, by a server, a request for an interface to display the reporting of the performance data, the request received from a remote client device; automatically identifying widgets to be rendered within the interface to display the reporting of the performance data, the widgets automatically identified based at least on events of interest detected in response to the request; and providing, by the server, the interface with the automatically identified widgets to display the reporting of the performance data to the remote client device.

The method can be implemented in various ways to include one or more of the following features. For example, the events of interest can be identified during a time period associated with the received request. The time period can affect the automatic identification of the widgets. The events of interest can include status alerts or errors or anomalies in the performance data. The performance data can include latencies associated with monitored business transactions at a monitored environment. The method can include ranking each of the identified events; and determining which of the identified events to render the widgets for based on the ranking of each event. The method can include rendering the widgets for only some of the identified events based on the ranking of each event. The method can include determining a display location of each widget in the interface based on the ranking of each event. The method can include dynamically positioning locations of the widgets in the interface based on a history of user interactions with the widgets. The method can include applying an importance score to each widget based on the user interactions with the widgets; and performing the dynamic positioning based on the importance score of each widget. The dynamically positioning can include positioning one or more of the widgets based on the history that indicates which of the widgets are viewed more than others.

In another aspect, another method for reporting performance data within an interface is disclosed. The method includes: providing, by a server, an interface having two or more widgets to display the reporting of the performance data to a remote client device; monitoring user interaction with each of the two or more widgets within the interface; and automatically updating the location of each of the two or more widgets in the interface based on the monitored user interaction with each widget.

The method can be implemented in various ways to include one or more of the following features. For example, the monitoring can include monitoring user mouse clicks, cursor hovering, interface scroll bar activity, or widget searching. The method can include generating a score for each displayed widget based on the monitoring of user interaction with each widget; and modifying the position of each widget within the display based on the score for each widget. The method can include modifying the position of each widget includes placing the widgets from top to bottom with the highest scoring widget at the top. The generating the score and the modifying the position can be performed for each user.

In yet another aspect, a system for reporting performance data within an interface is disclosed. The system includes a processor; memory; and one or more processing modules including instructions stored in the memory. The one or more processing modules are executable by the processor to cause operations to be performed including: receive, by a server, a request for an interface to display the reporting of the performance data, the request received from a remote client device; automatically identify widgets to be rendered within the interface to display the reporting of the performance data, the widgets automatically identified based at least on events of interest detected in response to the request; and provide, by the server, the interface with the automatically identified widgets to display the reporting of the performance data to the remote client device.

The system can be implemented in various ways to include one or more of the following features. For example, the events of interest can be identified during a time period associated with the received request. The system can be implemented to cause a ranking to be applied to each event and modify a position of each widget based on the ranking of each event. The events of interest can include status alerts or errors or anomalies in the performance data.

DETAILED DESCRIPTION

Figure 1:
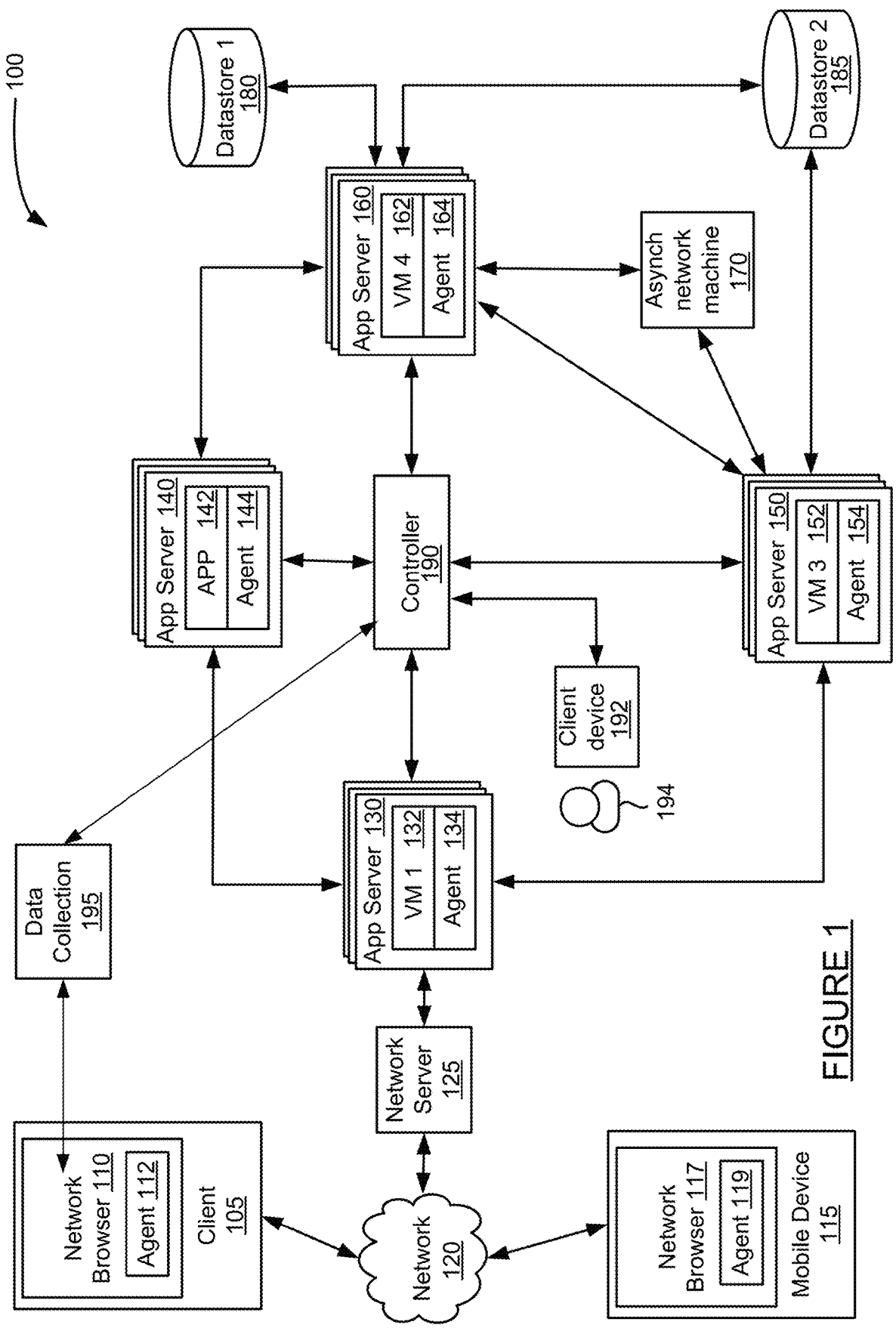
FIG. 1 is a block diagram of an exemplary system for monitoring and reporting data for a distributed business transaction.

The present technology provides an interface such as a dashboard for communicating the status of a distributed business transaction using widgets. A widget may be implemented by an object or other code that provides data regarding a particular portion or aspect of a distributed business transaction, an application or other code portion that implements at least a portion of the distributed business transaction, a network or aspect of a network over which the application occurs, a machine or aspect of a machine on which at least a portion of the distributed business application occurs, or performance data associated with the distributed business transaction, application, network, or machine. The widget may be represented graphically within the interface, such as for example a graph, chart, stop light, other graphics, and text. The widgets may be identified and automatically rendered such that they are useful and of interest to a user of the dashboard. The widgets may be identified by first receiving an indication of a time period for which a status can be provided. A search is performed for status events occurring within the received time period that relate to anomalies, errors, or other status events of interest to a particular user in the monitoring of a distributed business transaction. Each of the selected events is then ranked based on perceived importance to a user. The perceived importance may relate to the amount of delay experienced by an anomaly, the frequency of the anomaly or error, or other data that indicates the severity of an anomaly or error or the widespread effect of the anomaly or error on the distributed business transaction. A process is then initiated for creating and providing an interface with widgets based on the ranked events. The process may include selecting a particular type of graphical widget through which the ranked event will be displayed. If the data to be displayed through the interface is time series data that includes the number of errors over the period of time, the widget for displaying the data may be a streaming graph with X and Y axes. Once the widgets are chosen for the ranked events, the selected widgets can then be displayed within the interface.

The display location of the widgets within the interface may be dynamically positioned such that the most important widgets are provided to preferred locations for particular user. When widgets are provided within a user interface that is provided to a user, user interaction with the widgets through the interface may be recorded. In some implementations, mouse clicks, cursor hover activity, scrollbar activity, widgets search requests, and other input received from a user is recorded to determine user interest in one or more widgets within the interface. The user input which indicates which widgets a user is interested in, or viewing is used to determine an importance score for each widget. Based on the determined importance score for each widget, the widgets with associated importance scores may be placed in a more desirable location or less desirable location within the interface. For example, a widget with a history of being viewed often by user may be placed towards the top of an interface while they widget that is determined to not be viewed very often by user may be placed towards the bottom of an interface.

FIG. 1 is a block diagram of a system for monitoring and reporting data for a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed in this patent document.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120.

Network server 125 may be implemented as one or more servers implementing a network service, and may be implemented on the same machine as application server 130 or one or more separate machines. When network 120 is the Internet, network server 125 may be implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, servers 130, 140, 150, and 160 may each include Java code, .Net code, PHP code, Ruby code, C code, C++ or other binary code to implement applications and process requests received from a remote source. References to a virtual machine with respect to an application server are intended to be for exemplary purposes only.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating which with which tier and on which port. In some instances, the flow data collected from the language agent includes a source IP, a source port, a destination IP, and a destination port. The language agent may report the application data and call chain data to a controller. The language agent may report the collected flow data associated with a particular application to network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 190 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular, each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
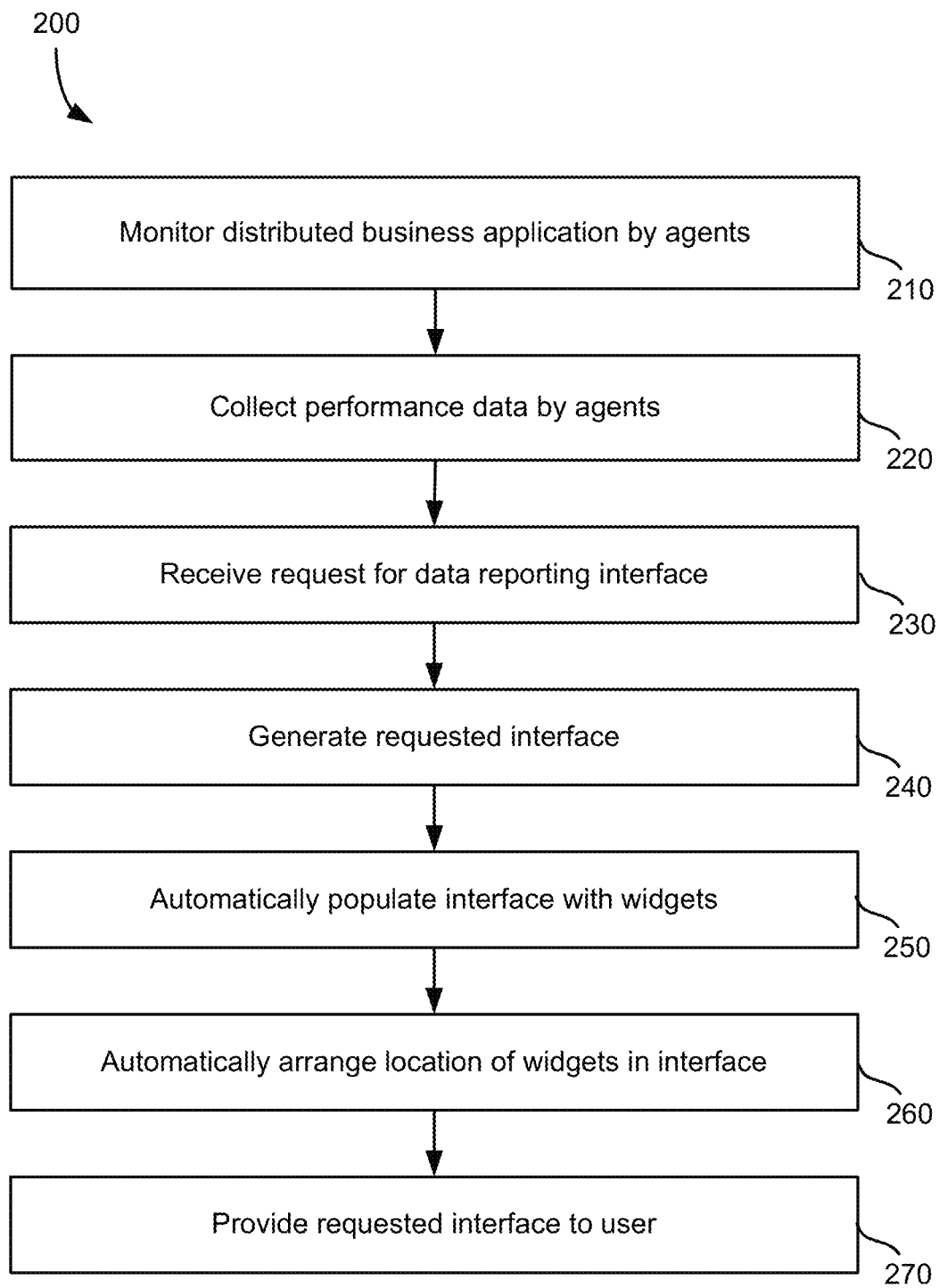
FIG. 2 is an exemplary method for providing a dynamic dashboard with intelligent visualization.

FIG. 2 is an exemplary method for automatically populating an interface with widgets. A distributed business transaction is monitored by agents at process 210. Agents that perform the monitoring can be installed on machines that perform distributed business transactions or process a distributed business transaction. Examples of such machines can include servers 130, 140, 150, and 160 as shown in FIG. 1. Monitoring a transaction may include having each agent monitor a particular application occurring on a particular server. Data may be collected by an agent, aggregated, and reported to a controller periodically, upon request, or upon some other event. Each agent may also collect log lines created by one or more logs on the application it is monitoring, logs associated with an application server it is hosted upon, or any other log accessible by the particular agent.

Performance data is collected by the agent at process 220. The collected performance data may include the start and stop time of a particular request, calls to other applications or systems, calls received by other applications or systems, network performance data, server statistics and metrics, and other data. A request may be received for a data reporting interface at process 230. The request may be for a dashboard or other user interface for displaying information about a deserted business transaction being monitored. The requested interface may be generated at process 240. Generating the interface may include generating a template from a collection of templates which can be populated with one or more widgets. The interface may be automatically populated with widgets at process 250. Automatically populating the interface may include identifying a time. To analyze, identifying events of interest that occur within that time period, and rendering widgets in the interface based on data associated with the widgets. Automatically populating an interface with widgets is discussed in more detail with respect to the method of FIG. 3.

Widgets may automatically be arranged within the interface at process 260. The widgets may be arranged within the interface based on perceived user interests in each widget. For example, user interest in widgets may be perceived based on mouse clicks, mouse hovering activity, scroll position, searches for a particular widget, and other input received from user. Automatically arranging widgets within an interface is discussed in more detail with respect to the method of FIG. 4. After populating an interface and arranging the widgets within the interface, the interface may be provided to a user at process 270. The interface will include widgets perceived to be of interest to the user based on a selected time period and have each widget positioned based on the perceived interest of the widget to the user.

Figure 3:
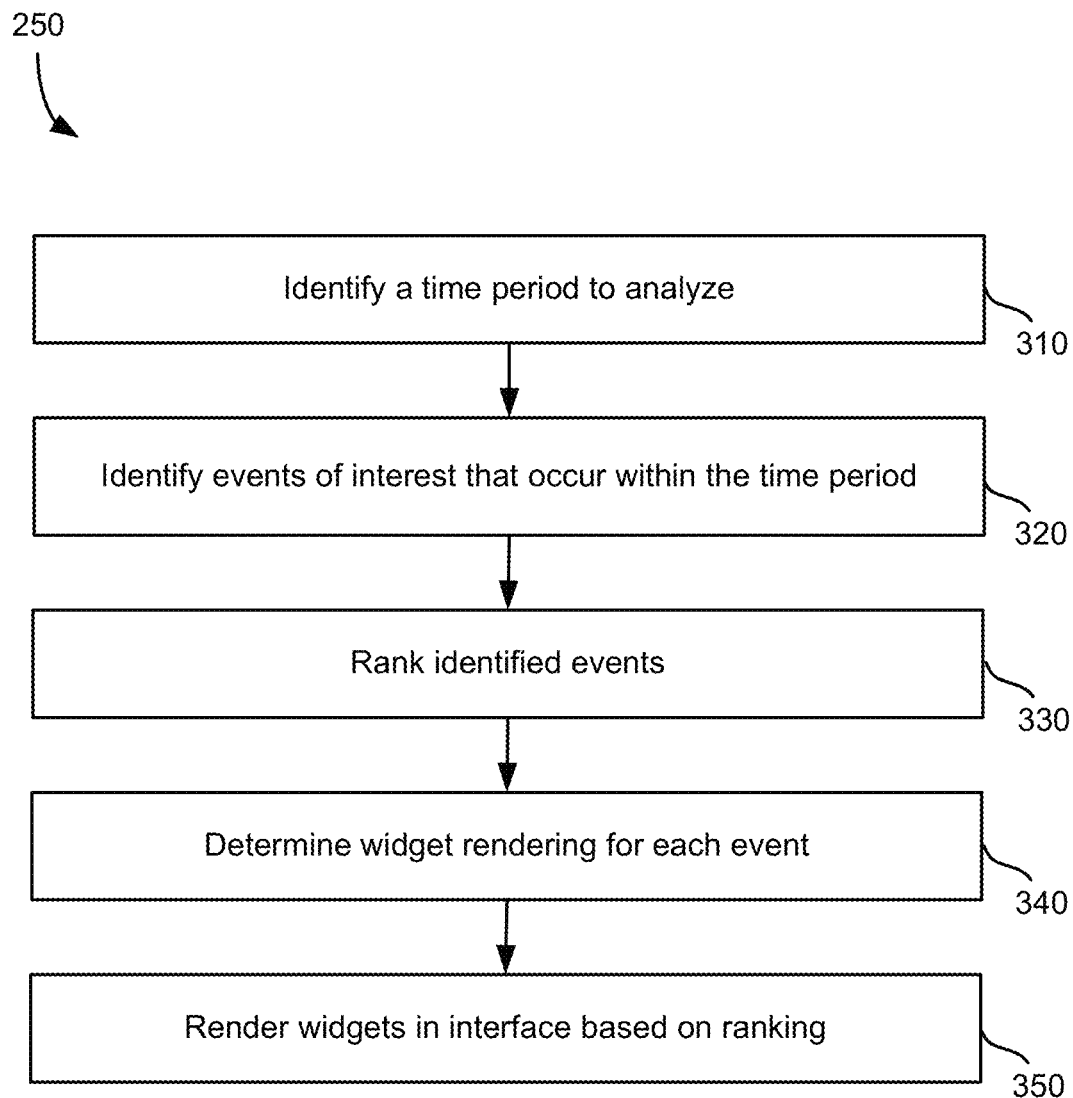
FIG. 3 is an exemplary method for automatically populating an interface with widgets.

FIG. 3 is an exemplary method for automatically populating an interface with widgets. The method of FIG. 3 provides more detail for process 250 of the method of FIG. 2. First, a time period to analyze is identified at process 310. The time period may be received by user or selected by default. The time period may be a period of 10 minutes, 30 minutes, one hour, two hours, one day, one week, one month, or any other time period. Events of interest that occur within the time period are identified at process 320. The events of interest may include anomalies in performance of a particular task or operation of a particular object or errors detected by agents monitoring the distributed business transaction.

The identified events are ranked at process 330. Ranking the events may include setting a numerical value for each event. The numerical values may be determined based on a number of factors, including but not limited to a number of occurrences for each event, a mapping of ranking values for a particular event, and the severity of an error, such as for example the degree of an anomaly.

A widget rendering is then determined for each event at process 340. In some implementations, only a subset of the identified events will be displayed within the interface. The subset may include the highest ranked widgets determined at process 330. For each widget to display in the interface, the rendering may include any of several types of graphic representations. Examples of a graphic representation of a widget include a bar chart, pie graphs, two-dimensional coordinate graph, metric meter, percentage indicator, and traffic light. Once the widget renderings are determined, the widgets are rendered in the interface based on the ranking at process 350. In some instances, only a specified number of widgets our displayed within the interface. The specified number of widgets may be those meeting a minimum threshold value for a ranking, and/or the highest ranked widgets to fill a certain number of widget spots in the interface.

Figure 4:
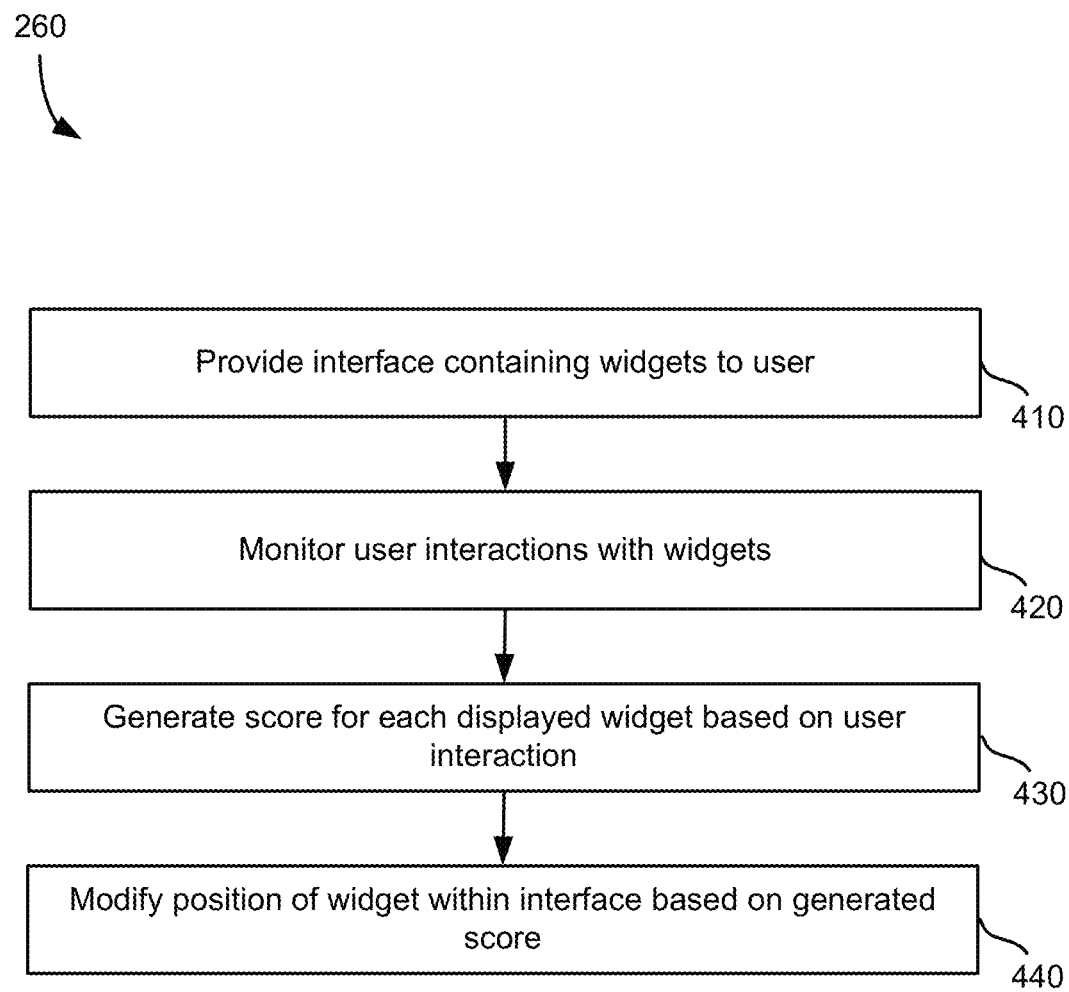
FIG. 4 is an exemplary method for automatically arranging the location of widgets within an interface.

FIG. 4 is an exemplary method for automatically arranging the location of widgets within an interface. The method of FIG. 4 provides more detail for process 260 of the method of FIG. 2. In interface containing the widgets is provided to a user at process 410. The widget may be provided from a controller to a remote client device associated with the user through a web browser, client application, or some other software. User may interact with the widgets within the interface at process 420 user interaction may include clicking on widgets, placing a cursor over a widget so the cursor hovers over the widget, moving scrollbars to scroll up and down within the interface, and searching for particular widgets.

A score may be generated for each widget displayed based on the user interaction at process 430. The score may include an accumulation of the number of mouse clicks, the number of cursor hovers, the number of times a document was scrolled such that the widget was in view of the interface, and the number of times a particular widget was searched for by the user. A position of a widget may be modified within the interface based on the generated score at process 440. The position of a widget may be modified such that widgets with a higher score are moved to an upper portion of the interface such that they are viewed by user when the interfaces first opened. Similarly, the position of a widget may be changed to a lower portion of the interface if the widget has a lower score in relation to other widgets pictured within the interface.

Figure 5:
FIG. 5 is an exemplary dashboard having widgets.

FIG. 5 is an exemplary dashboard having widgets. The widgets in the dashboard interface of FIG. 5 are displayed as graphical representations of application performance data over time. The widgets may be provided automatically based on whether the data include events or errors of interest during a time period specified by user. Additionally, the particular widgets may be moved towards the upper portion of the interface based on user interaction with those widgets.

Figure 6:
FIG. 6 is another exemplary dashboard having widgets

FIG. 6 is another exemplary dashboard having widgets. The widgets in the interface of FIG. 5 are displayed as graphical representations of data over time. The widgets may be provided automatically based on whether the data include events or errors of interest during a time period specified by user. Additionally, the particular widgets may be moved towards the upper portion of the interface based on user interaction with those widgets.

Figure 7:
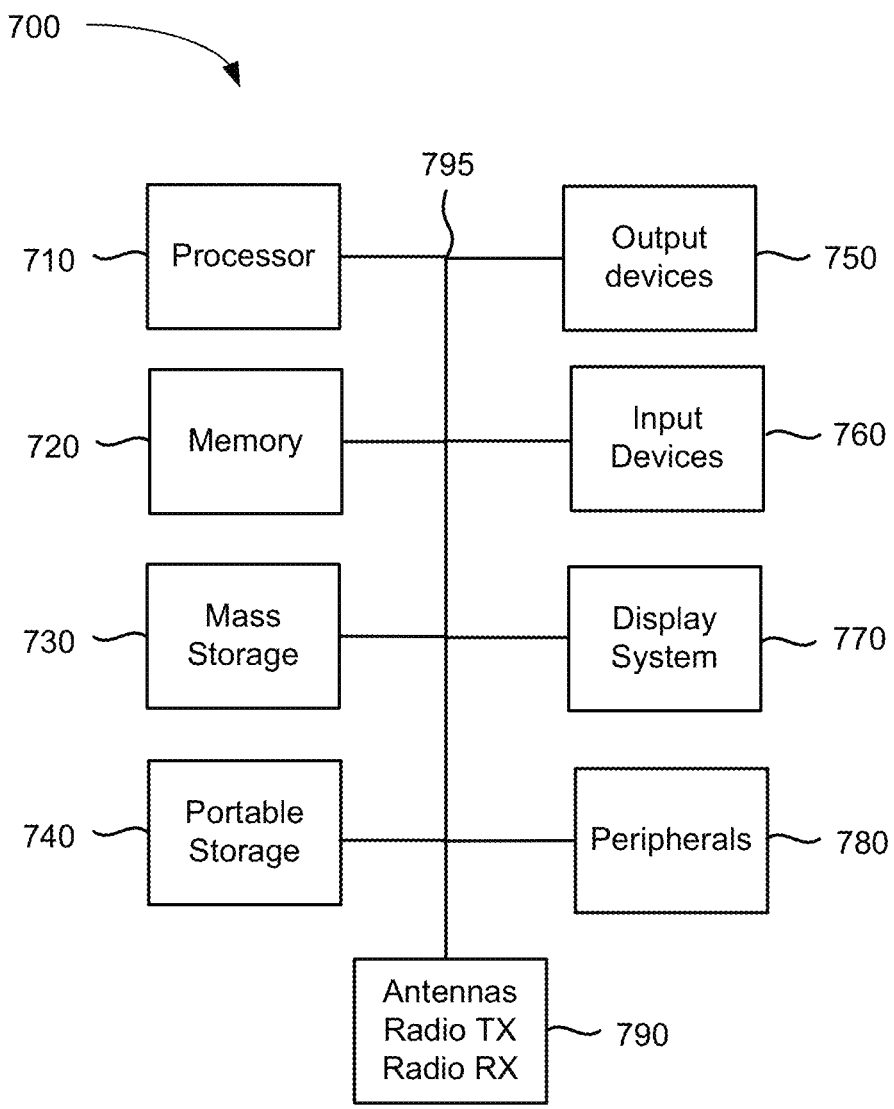
FIG. 7 is a block diagram of a computing environment for implementing the present technology.

FIG. 7 is a block diagram of a system for implementing the present technology. System 700 of FIG. 7 may be implemented in the contexts of the likes of client computers 105, 192, mobile device 115, servers 125, 130, 140, 150, 160, machine 170, data stores 180 and 190, and controller 190. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (110) buses.

Mass storage device 730, which may be implemented with a magnetic disk drive, an optical disk drive, a flash drive, or other device, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, USB drive, memory card or stick, or other portable or removable memory, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device. Display system 770 may also receive input as a touch-screen.

Peripherals 780 may include any type of computer support device to add additional functionality to the computer system. For example, peripheral device(s) 780 may include a modem or a router, printer, and other device.

The system of 700 may also include, in some implementations, antennas, radio transmitters and radio receivers 790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as Bluetooth devices, and other radio frequency networks. The devices may include one or more radio transmitters and receivers for processing signals sent and received using the antennas.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method, comprising:
receiving, by a server, a request for an interface to display a reporting of performance data associated with at least one monitored business transaction during a time period, the request received from a remote client device;
detecting, by the server, a plurality of events in the time period associated with the request;
ranking, by the server, each of the plurality of events based on a factor selected from a group consisting of a number of occurrences of a particular event, a mapping of at least one ranking value for the particular event, and a severity of the particular event;
automatically generating, by the server, the interface with two or more widgets based on the ranking of a given event, wherein the two or more widgets are selected and arranged for each event based on user interactions and the two or more widgets include at least one type of graph representing the performance data during the time period; and
providing, by the server, the generated interface-to the remote client device.

2. The method of claim 1, wherein the events include status alerts, errors, or anomalies in the performance data.

3. The method of claim 1, wherein the performance data includes latencies associated with monitored business transactions at a monitored environment.

4. The method of claim 1, including:
determining a display location of each widget in the interface based on the ranking of each event.

5. The method of claim 1, including:
dynamically positioning locations of the two or more widgets in the interface based on a history of user interactions with the two or more widgets.

6. The method of claim 5, including:
applying an importance score to each widget based on the user interactions with the two or more widgets; and
performing the dynamic positioning based on the importance score of each widget.

7. The method of claim 5, wherein the dynamically positioning includes positioning one or more of the two or more widgets based on the history that indicates which of the two or more widgets are viewed more than others.

8. A method for reporting performance data within an interface, comprising:
automatically generating, by a server, an interface with two or more widgets based on a ranking of each of a plurality of events detected by the server during a period of time, wherein the two or more widgets include at least one type of graph representing performance data associated with at least one monitored business transaction during the time period, wherein the ranking is selected from a group consisting of a number of occurrences of a particular event, a mapping of at least one ranking value for the particular event, and a severity of the particular event;
providing, by the server, the generated interface to a remote client device;
monitoring, by the server, user interaction with each of the two or more widgets within the interface;
dynamically updating, by the server, a location of each of the two or more widgets in the interface based on the monitored user interaction with each widget; and
providing, by the server, an updated interface to the remote client device.

9. The method of claim 8, wherein the monitoring includes monitoring user mouse clicks, cursor hovering, interface scroll bar activity, or widget searching.

10. The method of claim 8, further including:
generating a score for each displayed widget based on the monitoring of user interaction with each widget; and
modifying a position of each widget within a display based on the score for each widget.

11. The method of claim 10, wherein modifying the position of each widget includes placing the widgets from top to bottom with a highest scoring widget at the top.

12. The method of claim 10, wherein generating the score and the modifying the position are performed for each user.

13. A system for reporting performance data within an interface, the system comprising:
a processor;
memory; and
one or more processing modules including instructions stored in the memory and executable by the processor to cause operations to be performed including:
receive a request for an interface to display a reporting of the performance data associated with at least one monitored business transaction during a time period, the request received from a remote client device;
detect a plurality of events in the time period associated with the request;
rank each of the plurality of events based on a factor selected from a group consisting of a number of occurrences of a particular event, a mapping of at least one ranking value for the particular event, and a severity of the particular event;
automatically generate the interface with two or more widgets based on the ranking of a given event, wherein the two or more widgets are selected and arranged for each event based on user interactions and the two or more widgets include at least one type of graph representing the performance data during the time period; and provide the generated interface to the remote client device.

14. The system of claim 13, wherein the events include status alerts, errors, or anomalies in the performance data.

15. The system of claim 13, the operations further including:

determining a display location of each widget in the interface based on the ranking of each event.

16. The system of claim 13, the operations further including:

dynamically positioning locations of the two or more widgets in the interface based on a history of user interactions with two or more the widgets.

17. The system of claim 16, the operations further including:

applying an importance score to each widget based on the user interactions with the two or more widgets; and performing the dynamic positioning based on the importance score of each widget.

18. The system of claim 16, wherein the dynamically positioning includes positioning one or more of the two or more widgets based on the history that indicates which of the two or more widgets are viewed more than others.

19. The system of claim 13, wherein the performance data includes latencies associated with monitored business transactions at a monitored environment.

* * * * *

UNITED STATES PATENT AND TRADEMARK OFFICE
CERTIFICATE OF CORRECTION

PATENT NO. : 10,585,680 B2
APPLICATION NO. : 15/142813
DATED : March 10, 2020
INVENTOR(S) : Jonathan N. S. Whitney et al.

Page 1 of 1

It is certified that error appears in the above-identified patent and that said Letters Patent is hereby corrected as shown below:

In the Specification

Column 10, Line 10, please amend as shown:
via one or more input/output (I/O) buses.

Signed and Sealed this
Thirtieth Day of June, 2020

Andrei Iancu
*Director of the United States Patent and Trademark Office*